(12) United States Patent
Suzuki et al.

(10) Patent No.: US 9,090,465 B2
(45) Date of Patent: Jul. 28, 2015

(54) METHOD FOR PRODUCING CATALYST REFORMING TAR-CONTAINING GAS, METHOD FOR REFORMING TAR AND METHOD FOR REGENERATING CATALYST FOR REFORMING TAR-CONTAINING GAS

(75) Inventors: Kimihito Suzuki, Tokyo (JP); Kenichiro Fujimoto, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 759 days.

(21) Appl. No.: 12/998,163

(22) PCT Filed: Sep. 15, 2009

(86) PCT No.: PCT/JP2009/004613
§ 371 (c)(1),
(2), (4) Date: Apr. 14, 2011

(87) PCT Pub. No.: WO2010/035430
PCT Pub. Date: Apr. 1, 2010

(65) Prior Publication Data
US 2011/0182792 A1 Jul. 28, 2011

(30) Foreign Application Priority Data
Sep. 24, 2008 (JP) .................... 2008-244852

(51) Int. Cl.
*B01J 23/00* (2006.01)
*B01J 23/02* (2006.01)
(Continued)

(52) U.S. Cl.
CPC .............. *C01B 3/40* (2013.01); *B01J 23/002* (2013.01); *B01J 23/78* (2013.01); *B01J 23/94* (2013.01);
(Continued)

(58) Field of Classification Search
USPC ......... 502/327, 328, 335, 337, 340, 341, 355, 502/415, 439
See application file for complete search history.

(56) References Cited

U.S. PATENT DOCUMENTS 3,812,196 A * 5/1974 Kaneto et al. ............... 585/487
3,864,753 A * 2/1975 Becker et al. ............... 360/121
(Continued)

FOREIGN PATENT DOCUMENTS

JP 50-004001 1/1975
JP 57-070182 4/1982
(Continued)

OTHER PUBLICATIONS

Notice of Allowance, dated Nov. 28, 2011, issued in corresponding Russian Application No. 2011110727/4 (015725), with English Translation.
(Continued)

*Primary Examiner* — Cam N. Nguyen
(74) *Attorney, Agent, or Firm* — Kenyon & Kenyon LLP

(57) ABSTRACT

The present invention provides a method for producing a highly active catalyst for reforming tar-containing gas used to treat crude gas for chemical energy conversion consisting of converting to a fuel composition consisting mainly of methane, hydrogen and the like, by utilizing sensible heat possessed by crude gas generated during thermal decomposition of carbonaceous raw materials, and using the high chemical reaction activity of high-temperature tar contained in and incidental to the crude gas to convert the tar to light hydrocarbons in the presence of a catalyst; a tar reforming method; and, a method for regenerating a catalyst for reforming tar-containing gas.

8 Claims, 2 Drawing Sheets

(51) Int. Cl.
*B01J 23/06* (2006.01)
*B01J 23/08* (2006.01)
*B01J 23/42* (2006.01)
*B01J 23/58* (2006.01)
*B01J 20/00* (2006.01)
*B01J 21/04* (2006.01)
*C01B 3/40* (2006.01)
*B01J 23/78* (2006.01)
*B01J 38/06* (2006.01)
*B01J 38/12* (2006.01)
*C10K 3/02* (2006.01)
*C10B 57/18* (2006.01)
*B01J 37/03* (2006.01)
*B01J 23/94* (2006.01)

(52) U.S. Cl.
CPC ............... *B01J 37/031* (2013.01); *B01J 38/06* (2013.01); *B01J 38/12* (2013.01); *C10B 57/18* (2013.01); *C10K 3/02* (2013.01); *B01J 2523/00* (2013.01); *C01B 2203/1058* (2013.01); *C01B 2203/1252* (2013.01); *Y02E 20/16* (2013.01)

(56) References Cited

U.S. PATENT DOCUMENTS

| | | | | |
|---|---|---|---|---|
| 3,870,545 A * | 3/1975 | Tabacek et al. | | 427/250 |
| 3,919,120 A * | 11/1975 | Kato et al. | | 502/327 |
| 3,932,534 A | 1/1976 | Fukunaga et al. | | |
| 3,988,262 A * | 10/1976 | Andersen et al. | | 502/335 |
| 3,988,263 A * | 10/1976 | Hansford | | 502/337 |
| 4,040,979 A * | 8/1977 | Gembicki et al. | | 502/221 |
| 4,042,532 A * | 8/1977 | McArthur | | 502/335 |
| 4,104,201 A * | 8/1978 | Banks et al. | | 502/327 |
| 4,105,591 A * | 8/1978 | Banks et al. | | 502/335 |
| 4,209,424 A * | 6/1980 | Le Goff et al. | | 502/245 |
| 4,274,981 A * | 6/1981 | Suzuki et al. | | 502/178 |
| 4,307,248 A * | 12/1981 | Barnett et al. | | 564/358 |
| 4,455,391 A * | 6/1984 | Kitchener | | 502/315 |
| 4,490,480 A * | 12/1984 | Lok et al. | | 502/315 |
| 4,657,889 A * | 4/1987 | Ganguli et al. | | 502/335 |
| 4,734,392 A * | 3/1988 | Ganguli et al. | | 502/335 |
| 4,946,821 A * | 8/1990 | Oudejans et al. | | 502/335 |
| 5,266,729 A | 11/1993 | Bach et al. | | |
| 5,516,359 A | 5/1996 | Kang et al. | | |
| 6,673,743 B2 * | 1/2004 | Lok | | 502/337 |
| 7,297,655 B2 * | 11/2007 | Mesters | | 502/337 |
| 7,528,092 B2 * | 5/2009 | Berben et al. | | 502/251 |
| 7,897,037 B2 * | 3/2011 | Mesters | | 208/217 |
| 2003/0165424 A1 * | 9/2003 | Ramani et al. | | 423/651 |
| 2006/0100452 A1 | 5/2006 | Berben et al. | | |

FOREIGN PATENT DOCUMENTS

| | | |
|---|---|---|
| JP | 58-076487 | 5/1983 |
| JP | 59-044346 | 10/1984 |
| JP | 59-232174 | 12/1984 |
| JP | 08-134456 | 5/1996 |
| JP | 2002-054852 | 2/2000 |
| JP | 2003-055671 | 2/2003 |
| JP | 2004-000900 | 1/2004 |
| JP | 2005-053972 | 3/2005 |
| JP | 2007-229548 | 9/2007 |
| JP | 2007-283209 | 11/2007 |
| JP | 2010-017701 | 1/2010 |
| JP | 4436424 | 3/2010 |
| SU | 257371 A3 | 11/1969 |
| WO | WO 2008/049266 A1 | 5/2008 |

OTHER PUBLICATIONS

Office Action dated Sep. 1, 2011 in Russian Patent Application No. 2011110727/4.
International Search Report dated Dec. 28, 2009 issued in corresponding PCT Application No. PCT/JP2009/004613.
F. Basile, et al., "Catalytic Behaviour of Ni- and Rh-containing Catalysts in the Partial Oxidation of Methane at Short Residence Times", Studies in Surface Science and Catalysis, vol. 119 (1998) pp. 693-698.
Notice of Allowance, dated May 8, 2012, issued in corresponding Japanese Application No. 2010-530713, with an English translation thereof.
European Search Report dated Aug. 5, 2014 issued in corresponding European Application No. 09 815 852.0.

* cited by examiner

METHOD FOR PRODUCING CATALYST REFORMING TAR-CONTAINING GAS, METHOD FOR REFORMING TAR AND METHOD FOR REGENERATING CATALYST FOR REFORMING TAR-CONTAINING GAS

This application is a national stage application of International Application No. PCT/JP2009/004613, filed 15 Sep. 2009, which claims priority to Japanese Patent Application No. 2008-244852, filed in Japan on Sep. 24, 2008, the content of which is incorporated herein by reference in its entirety.

TECHNICAL FIELD

The present invention relates to a method for producing a reforming catalyst that reforms high-temperature, tar-containing gas generated during thermal decomposition of a carbonaceous raw material and converting to gas consisting mainly of hydrogen, carbon monoxide and methane, a tar gasification method (reforming method) that uses the catalyst, and a regeneration method used when the catalyst for reforming tar-containing gas has deteriorated.

The present application claims priority on the basis of Japanese Patent Application No. 2008-244852, filed in Japan on Sep. 24, 2008, the content of which is incorporated herein by reference.

BACKGROUND ART

Although the steel industry is a highly energy-consuming industry that accounts for roughly 10% of the total amount of energy consumed in Japan, roughly 40% of the continuous blast furnace steel production process is unused waste heat. This includes sensible heat of high-temperature unrefined coke oven gas (COG) (to be referred to as "crude COG") generated from coke ovens as a heat source that is easily recovered but has conventionally not been used. Methods consisting mainly of indirect heat recovery have been previously proposed in Patent Document 1 and Patent Document 2 as techniques for recovering the sensible heat of crude COG, and a method has been disclosed that consists of providing a heat transfer tube within a coke oven riser tube or between a riser tube portion and a gas collecting tube portion and recovering sensible heat by allowing a heating medium to circulate and flow through the inside of the heat transfer tube. In these methods, however, adhesion of tar, light oil and the like and densification attributable to carburization and aggregation progress incidental to the generated COG on the outer surface of the heat transfer pipe, resulting in unavoidable problems of decreases in heat transfer efficiency and heat exchange efficiency over time. A method has been disclosed in Patent Document 3 as a technology for solving these problems that consists of coating a catalyst such as crystalline aluminum silicate or crystalline silica onto the outer surface of a heat transfer pipe and decomposing tar and other adhered substances into low molecular weight hydrocarbons by means of the catalyst in order to maintain stable heat transfer efficiency. However, this method also does not leave the realm of an indirect heat recovery technology for crude COG sensible heat, and there are no considerations given whatsoever as to whether or not decomposition products of tar and other heavy hydrocarbons become light hydrocarbons that are easily utilized as gas fuels and the like. Moreover, the effects of deterioration of decomposition activity overtime caused by catalyst-poisoning sulfur compounds such as highly concentrated hydrogen sulfide contained in the crude COG have also not been examined.

On the other hand, a compound system combining gas turbine combined cycle (GTCC) power generation and another plant has been proposed with respect to so-called thermal energy-chemical energy conversion technology by which thermal energy, which greatly changes in quality according to temperature, is converted to chemical energy, and examples of such have been sporadically observed, including combining with oxygen production using a high-temperature oxygen-transporting solid electrolyte (Patent Document 4), and water vapor reforming and hydrogen production of natural gas using the sensible heat of gas turbine outlet exhaust gas, and its utilization as fuel (Patent Document 5). In each of these technologies, thermal energy is converted to chemical energy in the form of oxygen or hydrogen by allowing air or natural gas are to act through a functional material in the form of a solid electrolyte or catalyst.

There are hardly any technologies for converting to chemical energy by directly introducing a chemical reaction into a reactive gas formed at high temperatures in the presence of a catalyst by using the sensible heat thereof, and in nearly all cases in the prior art, sensible heat of high-temperature gas has been either recovered indirectly or not utilized at all, while only using the cooled gas after subjecting to various treatment. However, even though crude COG has sensible heat, since the content of sulfur compounds exceeds 2000 ppm, it is considered to be extremely difficult to realize from the viewpoint of designing a catalytic reaction for thermal decomposition of heavy hydrocarbons such as tar, and although studies have been made in the past as described in Patent Document 6, reforming activity has not necessarily been adequate. In addition, although energy conversion catalysts are typically produced by a loading method in which an active metal species is loaded from the outside onto a porous ceramic support such as silica or alumina, in the case of these methods, it has been difficult to increase dispersibility of the loaded metal component, and there is also susceptibility to sulfur poisoning and carbon deposition, it has been difficult to produce a catalyst suitable for decomposition reactions of tar consisting mainly of condensed polycyclic aromatic compounds that is susceptible to the occurrence of carbon deposition in an atmosphere containing highly concentrated sulfur compounds as described above. In addition, as a result of air combustion for the purpose of regeneration after performance has deteriorated following the reaction, sintering (coarsening) of the loaded metal granules occurs easily, thereby making it difficult to realize restoration of activity by regeneration.

In addition, with respect to production methods of mixtures of nickel-magnesia compounds and alumina as well, if a nickel-magnesia compound powder and an alumina powder are simply mixed followed by molding and baking, the state in which each element is present in the catalyst is not uniform, and the active species nickel in particular ends up coagulating without reaching a high surface area resulting in problems such as inadequate reforming activity and large amounts of deposited carbon, thereby preventing these methods from reaching a level able to withstand practical use.

On the other hand, although methods for producing oxides containing nickel, magnesium and aluminum are disclosed in publications such as Non-Patent Document 1 and Patent Document 8 with respect to materials that are baked after having formed a precipitate (mainly the formation of a hydrotalcite structure) with a precipitating agent from an aqueous solution in which each metal component has been dissolved, these methods had problems with practical application due to inadequate reforming activity and large amounts of deposited carbon.

As a result of conducting extensive studies with the foregoing in view, the inventors of the present invention determined that a catalyst produced according to a method consisting of forming a co-precipitate with a precipitating agent from an aqueous solution containing a nickel component and a magnesium component, drying and calcining the co-precipitate, and then drying and baking or drying, calcining, molding and baking a mixture obtained by adding alumina powder and water or an alumina sol, demonstrates high reforming activity and demonstrates comparatively little carbon deposition, thereby leading to the filing for patent (Japanese Patent Application No. 2008-155887). However, it was considered to be necessary to further reduce the amount of deposited carbon in order to develop a catalyst that demonstrates stable activity over a long period of time for the purpose of practical application.

Moreover, attention has recently been focused on the use of a biomass, which is a kind of carbonaceous raw material, as effective means of reducing carbon dioxide emission levels due to the problem of global warming, and research relating to highly efficient energy conversion of biomass is being conducted at various facilities. In addition, from the current viewpoint of securing energy resources, research relating to effective utilization of coal, which has been aggressively conducted in the past, is also being reconsidered for practical application. Among this research, although various studies have been conducted, including that described in Patent Document 7, on methods for generating crude gas (unrefined gas) by gasifying tar formed in the dry distillation of biomass and then utilizing its sensible heat while focusing particularly on reforming catalyst of tar using a catalyst, this approach has not always been adequate from the viewpoints of catalyst activity and catalyst regeneration in the same manner as decomposition reactions of coal-derived tar as previously described.

PRIOR ART DOCUMENTS

Patent Documents

[Patent Document 1] Japanese Examined Patent Application, Second Publication No. S59-44346
[Patent Document 2] Japanese Unexamined Patent Application, First Publication No. S58-76487
[Patent Document 3] Japanese Unexamined Patent Application, First Publication No. H8-134456
[Patent Document 4] U.S. Pat. No. 5,516,359
[Patent Document 5] Japanese Unexamined Patent Application, First Publication No. 2000-54852
[Patent Document 6] Japanese Unexamined Patent Application, First Publication No. 2003-55671
[Patent Document 7] Japanese Unexamined Patent Application, First Publication No. 2005-53972
[Patent Document 8] Japanese Unexamined Patent Application, First Publication No. S50-4001

Non-Patent Documents

[Non-Patent Document 1] F. Basile, et al., Stud. Surf. Sci. Catal., Vol. 119 (1998)

SUMMARY OF THE INVENTION

Problems to be Solved by the Invention

An object of the present invention is to provide a method for producing a reforming catalyst and a tar reforming method that are used to treat crude gas for chemical energy conversion consisting of converting to light chemical substances in the presence of a catalyst and converting to a fuel composition consisting mainly of methane, carbon monoxide and hydrogen by focusing on sensible heat possessed by crude gas (unrefined gas) generated during thermal decomposition of coal, biomass and other carbonaceous raw materials, and utilizing the high chemical reaction activity of high-temperature tar contained in and incidental to the crude gas. The reforming catalyst produced in the production method of the present invention demonstrates high performance and high resistance to carbon deposition even with respect to tar-containing gas containing high concentrations of hydrogen sulfide such as crude COG in particular.

In addition, an object of the present invention is to provide a method for regenerating a catalyst for reforming tar-containing gas capable of removing deposited carbon and adsorbed sulfur on a catalyst to restore catalyst activity and enable stable operation by introducing water vapor or air to create an oxidizing atmosphere for a catalyst that has deteriorated due to progression of a gasification reaction using the catalyst.

Means for Solving the Problems

During the course of designing a catalyst by focusing on elements that compose catalyst and catalyst composition, and conducting extensive studies on a method for producing that catalyst, the inventors of the present invention focused on a solid phase crystallization method for the catalyst of the present invention that converts tar contained in or incidental to crude gas to light chemical substances consisting mainly of methane carbon monoxide and hydrogen during thermal decomposition of carbonaceous raw materials. This solid phase crystallization method differs from conventional loading methods, and has various characteristics such as enabling a high-speed reaction allowing fine precipitation of active species metal, enabling inhibition of decreases in activity by being resistant to sintering (coarsening) since precipitated active metal strongly binds to a matrix (mother phase), and enabling regeneration that makes it possible to inhibit sintering by allowing precipitated active metal species to return to a solid solution in the matrix by baking. More specifically, the inventors of the present invention discovered a production method capable of converting heavy hydrocarbons to light chemical substances such as methane, carbon monoxide and hydrogen by increasing the surface area of active metal and allowing deposition of new active metal even when subjected to sulfur poisoning, even under harsh conditions in which components that easily cause carbon deposition, such as tar and other heavy hydrocarbons, are contained in large amounts in an atmosphere having high concentrations of sulfur components capable of causing sulfur poisoning, by preliminarily compounding an active species in the form of nickel with alumina or magnesia and the like serving as a matrix, and utilizing the fine deposition of nickel metal from an oxide matrix in clusters on an oxide surface during reduction treatment prior to the reaction.

Moreover, by mixing with an alumina binder added to mold the compound of nickel and magnesia described above under wet conditions, it was found that the mixed state of the nickel and magnesia compound with the alumina becomes highly uniform, and a molded catalyst produced by subsequently drying and crushing followed by molding and baking or by drying, calcining, crushing, molding and baking, is capable of demonstrating high reforming activity while also reducing the amount of deposited carbon.

The following indicates characteristics of the present invention:

(1) a method for producing a catalyst for reforming tar-containing gas, comprising: producing a catalyst by adding a precipitating agent to a mixed solution of a nickel compound and a magnesium compound, forming a precipitate by co-precipitating nickel and magnesium, forming a mixture by adding alumina powder and water or an alumina sol to the precipitate and mixing, and at least drying and baking the mixture;

(2) the method for producing a catalyst for reforming tar-containing gas described in (1), wherein the catalyst is produced by drying and baking or by drying, calcining, crushing, molding and baking, the mixture;

(3) a method for producing a catalyst for reforming tar-containing gas, comprising: producing a catalyst by adding a precipitating agent to a mixed solution of a nickel compound and a magnesium compound, forming a precipitate by co-precipitating nickel and magnesium, forming a mixture by adding alumina powder and water or an alumina sol to the precipitate and mixing, drying and calcining the mixture, and further forming a second mixture by mixing alumina powder and water or an alumina sol, and at least drying and baking the second mixture;

(4) the method for producing a catalyst for reforming tar-containing gas described in (3), wherein the catalyst is produced by drying and baking, or by drying, calcining, crushing, molding and baking, the second mixture;

(5) the method for producing a catalyst for reforming tar-containing gas described in any one of (1) to (4), wherein the catalyst for reforming tar-containing gas is produced so that the nickel content is 1 to 50% by weight, the magnesium content is 5 to 45% by weight, and the alumina content is 20 to 80% by weight;

(6) the method for producing a catalyst for reforming tar-containing gas described in (5), wherein the catalyst for reforming tar-containing gas is produced so that the nickel content is 1 to 35% by weight, the magnesium content is 10 to 25% by weight, and the alumina content is 20 to 80% by weight;

(7) a method for reforming tar-containing gas that uses the catalyst for reforming tar-containing gas produced according to anyone of the production methods described in (1) to (6);

(8) the method for reforming tar-containing gas described in (7), wherein tar contained in the tar-containing gas is reformed and gasified by contacting hydrogen, carbon dioxide and water vapor in tar-containing gas generated during thermal decomposition of a carbonaceous raw material in the presence of the catalyst for reforming tar-containing gas or in the presence of the catalyst after reduction;

(9) the method for reforming tar-containing gas described in (8), wherein the tar-containing gas is reformed and gasified by contacting any one of at least hydrogen, carbon dioxide and water vapor from the outside with the tar-containing gas generated during thermal decomposition;

(10) the method for reforming tar-containing gas described in any one of (7) to (9), wherein the tar-containing gas is tar-containing gas containing 20 ppm or more of hydrogen sulfide;

(11) the method for reforming tar-containing gas described in any one of (7) to (10), wherein oxygen-containing gas is added to the reformed gas, contacted with the tar-containing gas, and a portion of the hydrogen or hydrocarbons in the tar-containing gas is combusted;

(12) the method for reforming tar-containing gas described in any one of (7) to (11), wherein the tar-containing gas is a dry distillation gas generated during dry distillation of coal;

(13) the method for reforming tar-containing gas described in any one of (7) to (11), wherein the tar-containing gas is coke oven gas discharged from a coke oven;

(14) the method for reforming tar-containing gas described in any one of (7) to (11), wherein the tar-containing gas is dry distillation gas generated during dry distillation of at least either wood-based biomass or food waste-based biomass;

(15) the method for reforming tar-containing gas described in any one of (7) to (14), wherein the tar-containing gas is contacted with the catalyst for reforming tar-containing gas at 600 to 1000° C.; and,

(16) a method for regenerating a catalyst for reforming tar-containing gas, comprising: regenerating the catalyst by contacting at least either of water vapor or air with the catalyst in the case performance of the catalyst has deteriorated due to at least either of carbon deposition or sulfur poisoning as a result of carrying out the method for reforming tar-containing gas described in any one of (7) to (15).

Effects of the Invention

According to the present invention, a reforming catalyst can be produced that has high activity, high resistance to carbon deposition and is capable of converting to a fuel composition consisting mainly of methane, carbon monoxide and hydrogen by converting tar contained in and incidental to crude gas generated during thermal decomposition of carbonaceous raw materials to light chemical substances in the presence of catalyst. In particular, a reforming catalyst can be produced that demonstrates high performance and has high resistance to carbon deposition even with respect to tar-containing gas containing high concentrations of hydrogen sulfide such as biomass gasified gas or crude COG. In addition, according to one aspect of the present invention, tar can be converted to light chemical substances by using sensible heat of tar-containing gas.

EMBODIMENTS OF THE INVENTION

Figure 1:
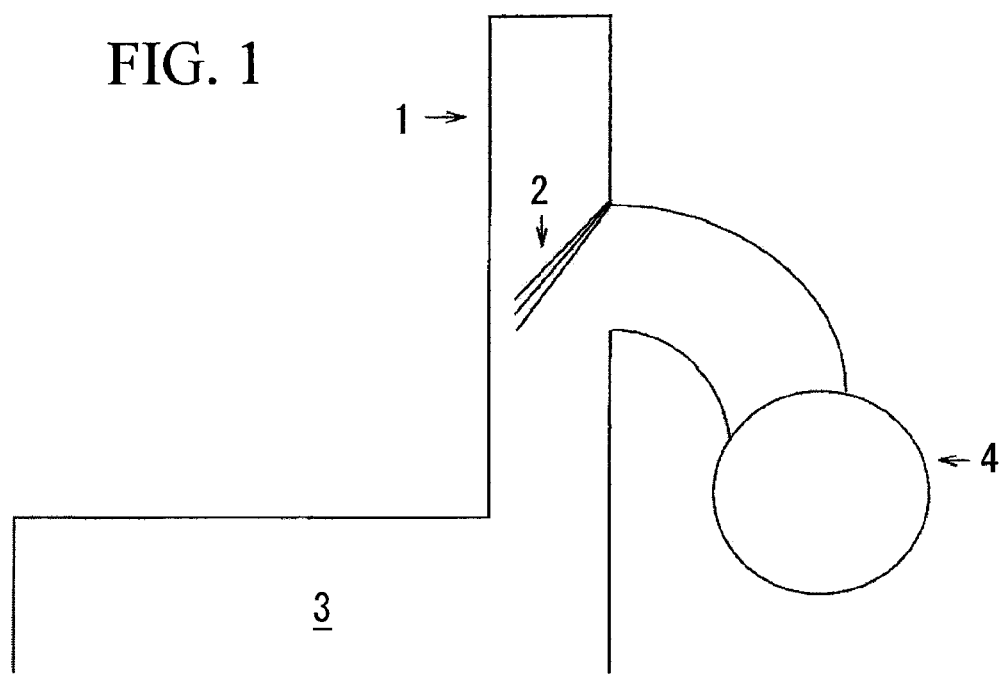
FIG. 1 is a drawing showing a portion where coke oven gas is discharged from a coke oven.

The following provides a more detailed explanation of the present invention by indicating specific examples thereof.

The catalyst for reforming tar-containing gas produced according to the production method of the present invention functions as a main active component that allows nickel (Ni) to cause a reformation reaction between heavy hydrocarbons and water vapor, hydrogen and carbon dioxide either present or introduced from the outside in the gas. Even in cases in which hydrogen sulfide is present at a high concentration in the tar-containing gas, the catalyst is thought to be resistant to reductions in activity caused by sulfur poisoning since the nickel metal is finely dispersed in clusters on the catalyst surface resulting in increased surface area, and in a reducing atmosphere, new active metal granules finely precipitate from a matrix even if the active metal granules are subjected to poisoning during the reaction. Active metal granules can be made to precipitate from this matrix compound in the form of fine clusters in a reducing atmosphere. In addition, tar, which is mainly composed of condensed polycyclic aromatic compounds, is in an extremely reactive state at high temperatures immediately following dry distillation, and as a result of contacting highly active nickel metal that is finely dispersed and as a high specific surface area, it is thought to be highly efficiently converted and decomposed to light hydrocarbons. In addition, among components that are compounded with elemental nickel, magnesia is a basic oxide that has a function of adsorbing carbon dioxide, and since it demonstrates the role of reacting with deposited carbon on a main active component element resulting in its removal by oxidation as carbon monoxide, it is thought to be able to keep catalyst surfaces clean and maintain stable catalyst performance for a long period of time. In addition to demonstrating a binder-like function that maintains a stable compound matrix, alumina finely cleaves crystal phases containing nickel and magnesium, and as a result of causing these materials to be highly dispersed in an oxide solid phase, fulfills a function that causes nickel grains of active species that precipitate from each crystal phase onto the surface to be small and in a highly dispersed state.

A "carbonaceous raw material" as referred to here indicates a raw material that contains carbon that forms tar accompanying thermal decomposition, and refers to a wide-range of materials containing carbon as a constituent element, such as coal, biomass and plastic containers and packages. In particular, "biomass" refers to wood-based biomass, such as residual forest cuttings, sustainably harvested wood, unused trees, lumber mill remnants, construction waste materials or secondary products such as wood chips and pellets that use these as raw materials; paper-based biomass such as waste paper that can no longer be reused as recycled paper; grass-based biomass such as bamboo grass, silver grass and other weeds mowed in parks or along rivers and roads; food waste-based biomass such as kitchen wastes, agricultural residue such as rice straw, wheat straw or rice husks; resource crops such as sugar cane and other saccharide resources, corn and other starch resources, or rapeseed and other oils; sludge; and, livestock excrement.

In addition, although the properties thereof differ according to the raw material that is thermally decomposed, the "tar" that is generated during thermal decomposition of carbonaceous raw materials refers to an organic compound that is a liquid at room temperature in which is contained 5 or more carbon atoms, and is a mixture composed of linear hydrocarbons and cyclic hydrocarbons. Specific examples include, but are not limited to, those mainly composed of condensed polycyclic aromatic compounds such as naphthalene, phenanthrene, pyrene or anthracene in the case of thermal decomposition of coal, compounds mainly composed of benzene, toluene, naphthalene, indene, anthracene or phenol in the case of thermal decomposition of wood-based waste, and heterocyclic compounds containing different elements such as elemental nitrogen in a six-membered or five-membered ring such as indole or pyrrole in addition to the aforementioned examples in the case of thermal decomposition of food waste. Thermally decomposed tar exists in gaseous form when in a high-temperature state immediately after thermal decomposition.

In addition, a tar reforming reaction in which tar is gasified by contact decomposition is a reaction that converts tar consisting mainly of heavy hydrocarbons to light chemical substances such as methane, carbon monoxide and hydrogen. Although the reaction pathway is complex and not necessarily fully understood, this reaction is considered to take place in the form of a hydrogenation reaction, a steam reforming reaction or a dry reforming reaction and the like that can take place between hydrogen, water vapor, carbon dioxide and the like either present in tar-containing gas or introduced from the outside. Since this series of reactions is endothermic, although a high-temperature gas having sensible heat present in a reaction vessel is reformed within a catalyst layer and decreases in temperature at an outlet in the case of actual application, in the case of reforming heavy hydrocarbon components such as tar more efficiently, introducing air or oxygen into the catalyst layer as necessary makes it possible to allow the reaction to further proceed while maintaining the temperature of the catalyst layer to a certain extent with the heat of combustion resulting from combustion of a portion of the hydrocarbon components.

The reforming catalyst of the present invention is produced by forming a precipitate by using a precipitating agent in a mixed solution of a nickel compound and a magnesium compound, forming a mixture by adding alumina powder and water or an alumina sol to the precipitate and mixing without drying or baking the precipitate, and at least drying or baking the mixture. Alternatively, the reforming catalyst of the present invention is produced by adding a precipitating agent to a mixed solution of a nickel compound and a magnesium compound, forming a precipitate by co-precipitating nickel and magnesium, forming a mixture by adding alumina powder and water or an alumina sol to the precipitate and mixing without drying or baking the precipitate, forming a second mixture by further mixing in alumina powder and water or an alumina sol after drying and calcining the mixture, and at least drying and baking the second mixture.

In addition, examples of methods for at least drying and baking the mixture or the second mixture include drying and baking; drying, crushing and baking; drying, crushing, molding and baking; drying, calcining, crushing, molding and baking; and drying, crushing, calcining, crushing, molding and baking.

Here, there are no particular limitations on the temperature and drying method when drying the mixture, and an ordinary drying method may be used. The dried mixture may be coarsely crushed as necessary followed by baking (coarse crushing is not required in the case the precipitate retains a granular form after drying as a result of drying a fluidized bed).

Furthermore, the mixture is preferably filtered prior to drying since the bother associated with drying can be reduced and the amount of energy required for drying can be decreased. Moreover, the precipitate is more preferably washed with pure water and the like after filtration since this enables the amount of impurities to be reduced.

In addition, baking of the mixture can be carried out in air, and the temperature is preferably within the range of 700 to 1300° C., and more preferably within the range of 900 to 1150° C. Although a high baking temperature causes sintering of the mixture resulting in increased strength, on the other hand, since a decrease in specific surface area causes catalyst activity to decrease, it is desirable to determine the baking temperature in consideration of the balance there between. After baking, although the mixture can be used directly as a catalyst, it can also be used as a molded product by molding with a press mold and the like. Furthermore, calcining and molding steps can also be added between the drying and baking, and if it is necessary to put into granular form prior to molding between the calcining and molding steps, molding may be carried out after crushing. In this case, calcining is carried out in air at a temperature of about 400 to 800° C., and molding is carried out by press molding and the like.

By using a catalyst produced according to such a production method, incidental heavy hydrocarbons such as tar can be reformed with high efficiency and converted to light chemical substances mainly consisting of hydrogen, carbon monoxide and methane even in the case of tar-containing gas consisting mainly of condensed polycyclic aromatic compounds that contains large amounts of hydrogen sulfide generated during thermal decomposition of carbonaceous raw materials and is susceptible to the occurrence of carbon deposition. In addition, by contacting at least water vapor or air with the catalyst at a high temperature when catalyst performance has deteriorated, deposited carbon and adsorbed sulfur on the catalyst can be removed, thereby making it possible to restore catalyst performance and allow stable operation for a long period of time.

The catalyst for reforming tar-containing gas produced according to the present production method differs from that obtained simply by forming a co-precipitate of nickel and magnesium followed by physically mixing alumina powder into the baked powder and then molding and baking, in that, by wet-mixing alumina powder and water or an alumina sol into a precipitate of nickel and magnesium, the water component containing the alumina component is able to form a highly uniform mixture with the co-precipitate of nickel and magnesia. Consequently, as a result of drying and baking, or drying, calcining, crushing, molding and baking the mixture, a sintered body is formed in which the nickel and magnesium compounds and the alumina are uniformly distributed, the nickel-magnesia crystal phase becomes finer, and since Ni grains precipitated there from are highly finely dispersed, a molded product is thought to be able to be obtained that has high activity and a low amount of carbon deposition.

Actually, an evaluation of the size of Ni grains as determined from the Ni(200) peak by wide-angle X-diffraction of the catalyst after reaction revealed that Ni grains precipitated in a state having an extremely small average grain size.

More specifically, it is suitable to use various metal compounds having high solubility in water when preparing the mixed solution of a nickel compound and a magnesium compound, and examples of compounds that can be used preferably include not only inorganic salts such as nitrates, carbonates, sulfates or chlorides, but also organic salts such as acetates. Nitrates, carbonates or acetates are particularly preferable since they are considered to be less likely to leave impurities that can cause catalyst poisoning after baking. In addition, any precipitating agent can be used for the precipitating agent used when forming a precipitate from these solutions provided it causes the pH of the solution to change to neutral-basic pH, at which nickel and magnesium precipitate mainly as hydroxides. In particular, precipitating agents such as an aqueous potassium carbonate solution, aqueous sodium carbonate solution, aqueous ammonia solution or urea solution are used preferably.

Moreover, the reforming catalyst of the present invention preferably has a nickel content of 1 to 50% by weight, which serves as the main active component. If the nickel content is less than 1% by weight, the reforming performance of the nickel is not adequately demonstrated, thereby making this undesirable. In the case the nickel content exceeds 50% by weight, since the contents of magnesium and aluminum that form a matrix decrease, the concentration of nickel metal that precipitates on the catalyst increases and becomes increasingly coarse, thereby resulting in the risk of deterioration of performance over time under the present reaction conditions.

In addition, the magnesium content is preferably 5 to 45% by weight. If the magnesium content is less than 5% by weight, since it tends to be difficult to maintain stable catalyst performance over a long period of time by inhibiting carbon deposition of hydrocarbons by taking advantage of the basic oxide properties possessed by magnesia, the magnesium content is preferably 5% or more. In the case the magnesium content exceeds 45% by weight, since the contents of the other components of nickel and aluminum decrease, there is the risk of being unable to adequately demonstrate the reforming activity of the catalyst.

Moreover, the alumina content is preferably 20 to 80% by weight. If the alumina content is less than 20% by weight, a ceramic consisting mainly of nickel-magnesia is formed, that causes a remarkable decrease in strength when molded, thereby making this undesirable. In the case the alumina content exceeds 80% by weight, since the ratios of nickel, which serves as the main active component, and magnesia, which inhibits carbon deposition, decrease, there is the risk of being unable to adequately demonstrate the reforming activity of the catalyst.

Furthermore, the reforming catalyst of the present invention is more preferably produced so that the nickel content is 1 to 35% by weight, the magnesium content is 10 to 25% by weight, and the alumina content is 20 to 80% by weight. In addition, the alumina referred to here indicates that which is added to the oxides of the nickel and magnesium in the form of alumina powder or an alumina sol. In the case of adding as a powder, it is preferable to use as a fine a grain size as possible, and for example, an average grain size of 100 micrometers or less is preferable, and the powder is used in the form of a slurry by adding water and the like at the time of mixing. In addition, in the case of adding in the form of an alumina sol, it is preferable to use that in which the alumina granules have an average grain size of 100 nanometers of less. In addition, it is preferable to prepare each of the starting materials after calculating in advance in order to adjust the contents of each metal species so as to be within the aforementioned ranges. Furthermore, once a desired component composition has been achieved for the catalyst, the catalyst may be subsequently prepared based on the formula used at that time.

In addition, although unavoidable impurities that enter the catalyst production process or other components that do not alter catalyst performance may also be contained in addition to the aforementioned elements, it is desirable to prevent contamination by impurities as much as possible.

Furthermore, a method referred to as scanning high-frequency inductively coupled plasma (ICP) method can be used to measure the content of each metal species that composes the reforming catalyst. More specifically, after crushing a sample, an alkali fusing agent (such as sodium carbonate or sodium borate) is added followed by heating and melting in a platinum crucible and completely dissolving in a hydrochloric acid solution while heating after cooling. When the solution is injected into an ICP analyzer, since the sample solution is atomized and thermally excited in the high-temperature plasma state within the analyzer, which causes the generation of an emission spectrum at a wavelength characteristic to the element when the sample returns to its ground state, the types of elements contained and their amounts can be qualitatively and quantitatively determined from the emission wavelengths and their intensities.

Here, the reforming catalyst produced in the present invention may be in the form of a powder or molded product, and in the case of a molded product, may be spherical, cylindrical, ring-shaped, wheel-shaped or granular and the like, or may have a catalyst component coated onto a metal or ceramic honeycomb-like base material. In addition, in the case of using in a fluidized bed, a catalyst may be used that has been formed by spray-drying and the like. In addition, in the case of using in a fixed bed or moving bed, examples of preferable molding methods include, but are not limited to, granulation, extrusion molding, press molding and tablet molding.

According to a method for reforming tar-containing gas that uses the reforming catalyst obtained according to the production method of the present invention, the previously described actions and effects are obtained. In this method for reforming tar-containing gas, tar present in tar-containing gas is reformed and gasified by contacting hydrogen, carbon dioxide or water vapor either present in the gas or introduced from the outside with tar-containing gas generated during thermal decomposition of carbonaceous raw materials in the presence of the catalyst or after having reduced the catalyst. Although it is preferable to reduce the reforming catalyst, since reduction proceeds during the reaction, catalyst reduction is not required. Thus, tar present in tar-containing gas is reformed and gasified by contacting a mixed gas obtained by adding water vapor and air or oxygen introduced from the outside with tar-containing gas generated during thermal decomposition of carbonaceous raw materials either in the presence of the catalyst or after having reduced the catalyst.

Here, although there are no particular limitations on conditions in the case of reducing the catalyst provided reduction is carried out at a comparatively high temperature and in a reducing atmosphere since nickel grains serving as the active metal precipitate in the form of fine clusters from the catalyst of the present invention, the conditions may consist of, for example, a gaseous atmosphere containing at least any of hydrogen, carbon monoxide or methane, a gaseous atmosphere in which water vapor is mixed with these reducing gases, or an atmosphere in which nitrogen or other inert gas is mixed with these gases. In addition, the reduction temperature is preferably, for example, 600 to 1000° C., the reduction time is dependent on the amount of catalyst filled and although 30 minutes to 4 hours, for example, is preferable, it is only required to be the amount of time required to reduce the entire amount of filled catalyst, and there are no particular limitations on this condition.

A fixed bed type, fluidized bed type or moving bed type reactor is preferably used for the catalyst reactor, and the inlet temperature of the catalyst layer thereof is preferably 600 to 1000° C. In the case the inlet temperature of the catalyst layer is lower than 600° C., there is hardly any catalyst activity demonstrated when reforming tar to light hydrocarbons consisting mainly of hydrogen, carbon monoxide and methane, thereby making this undesirable. On the other hand, in the case the inlet temperature of the catalyst layer exceeds 1000° C., a heat-resistant structure is required, thereby increasing the cost of the reforming device and making this economically disadvantageous. In addition, the inlet temperature of the catalyst layer is more preferably 650 to 1000° C. Furthermore, in the case the carbonaceous raw material is coal, the reaction can be carried out at a comparatively high temperature, while in the case of wood-based biomass, paper-based biomass or food waste-based biomass, the reaction can be carried out at a comparatively low temperature.

In addition, although a coke oven is generally used to generate tar-containing gas in the case of using coal for the raw material, or an externally heated rotary kiln, moving bed oven or fluidized bed oven and the like are used in the case of using biomass for the raw material, there are no particular limitations thereon.

Here, tar present in gas can be reformed and gasified by the present invention even if tar-containing gas generated by thermal decomposition or partial oxidation of carbonaceous raw materials is tar-containing gas having an extremely high hydrogen sulfide concentration such as high-temperature coke oven gas discharged from a coke oven. The thermal decomposition or partial oxidation referred to here specifically indicates the production of tar-containing gas by dry distillation or by oxidizing only a portion of the carbonaceous raw material for the purpose of gasification. In current coke ovens, although coke is produced by filling the oven with raw material coal followed by heating and dry distillation, as shown in FIG. 1, incidentally generated coke oven gas is collected in a dry main 4 serving as a gas collecting tube from a portion referred to as a riser tube 1 located in the top of the oven after cooling by spraying with aqueous ammonia 2. However, even though the gas component retains sensible heat of about 800° C. in the riser tube 1 of a coke oven 3, it ends up being rapidly cooled to 100° C. or lower after spraying with the aqueous ammonia 2, thereby preventing the sensible heat from being used effectively. Consequently, if it is possible to convert heavy hydrocarbons such as tar to fuel components in the form of light hydrocarbons such as hydrogen, carbon monoxide and methane while effectively utilizing this gas sensible heat, not only would this lead to energy amplification, but as a result of also significantly amplifying the volume of the reducing gas produced therein, it would be possible to employ a process for producing reduced iron by applying to iron ore, for example, thereby making it possible to drastically reduce emission levels of carbon dioxide generated in current blast furnace process used to reduce iron ore with coke. According to the present invention, coke oven gas retaining sensible heat generated in a coke oven can be converted to fuel components in the manner of light hydrocarbons such as hydrogen, carbon monoxide and methane by carrying out reforming while effectively using the gas sensible heat by contacting the coke oven gas with the reforming catalyst produced according to the production method of the present invention.

In addition, although the reforming catalyst of the present invention allows the reforming reaction to proceed stably even in a hydrogen sulfide atmosphere, the hydrogen sulfide concentration in the gas is preferably as low as possible since this results in less poisoning of the catalyst. In particular, the hydrogen sulfide concentration is preferably 4000 ppm or less and more preferably 3000 ppm or less.

On the other hand, a tar reforming catalyst incorporated in a catalyst reactor undergoes deterioration of catalyst performance due to carbon precipitating on the catalyst surface during conversion of tar to light chemical substances consisting mainly of hydrogen, carbon monoxide and methane, or due to adsorption of sulfur components onto the catalyst that are contained in thermal decomposition gas obtained in the thermal decomposition step as previously described. Therefore, the deteriorated catalyst can be regenerated by removing carbon on the catalyst surface by introducing water vapor into the catalyst reactor and allowing the water vapor to react with the carbon, or by removing sulfur that has been adsorbed onto the catalyst by a reaction between the water vapor and sulfur. In addition, by replacing all or a portion of the water vapor with air and introducing it, carbon on the catalyst surface can be removed by a combustion reaction between oxygen in the air and the carbon, or sulfur that has adsorbed onto the catalyst can be removed by reacting the oxygen with the sulfur, then the catalyst can be regenerated.

EXAMPLES

Although the following provides a more detailed explanation of the present invention through examples thereof, the present invention is not limited to these examples.

Example 1

An aqueous potassium carbonate solution heated to 60° C. was added to an aqueous solution heated to 60° C. prepared by accurately weighing out nickel nitrate and magnesium nitrate so that the molar ratio of each metal element was 1:9, and the nickel and magnesium were co-precipitated as hydroxide followed by adequately stirring with a stirrer. Subsequently, after aging by continuing to stir for a fixed period of time while holding at 60° C., the precipitate was subjected to suction filtration followed by adequately washing with pure water at 80° C. Subsequently, alumina sol was added to the resulting precipitate to 50% by weight as alumina followed by adequately mixing in a mixer equipped with a stirring paddle, transferring the mixture to a recovery flask, attaching the flask to a rotary evaporator and evaporating the water by aspirating while stirring. The mixture of nickel, magnesium and alumina adhered to the walls of the recovery flask were transferred to an evaporating dish, dried at 120° C. and crushed with a mortar and pestle followed by press-molding the powder into the shape of tablets having a diameter of 3 min using a compression molding machine to obtain a molded tablet. The molded tablet was baked in air at 1100° C. to prepare a molded catalyst in which 50% by weight of alumina was mixed into $Ni_{0.1}Mg_{0.9}O$.

60 cc aliquots of this catalyst were fixed with quartz wool so as to be positioned in the center of an SUS reaction tube, a thermocouple was inserted into the center of the catalyst layer, and the fixed bed reaction tubes were set at the prescribed locations.

Before beginning the reforming reaction, the reactor was heated to 800° C. in a nitrogen atmosphere, and reduction treatment was carried out for 30 minutes while allowing hydrogen gas to flow through the reactor at 100 cc/min. Subsequently, a 1:1 mixture of hydrogen and nitrogen used as simulated coke oven gas and $H_2S$ at the concentration shown in Table 1 were introduced by adjusting each gas to a total of 125 cc/min followed by evaluating the reaction at each temperature shown in Table 1 at normal pressure. In addition, 1-methylnaphthalene, which is actually contained in tar and is a liquid substance that has low viscosity at normal temperatures, was used as a typical example of a substance that simulates tar generated during dry distillation of coal, and introduced into the reaction tubes with a precision pump at a flow rate of 0.025 g/min. In addition, pure water was introduced into the reaction tubes with a precision pump at a flow rate of 0.1 g/min so that the ratio of (number of moles of $H_2O$)/(number of carbon moles of 1-methylnaphthalene)=3. After respectively removing naphthalene and water from the product gas discharged from the outlet by passing through a room temperature trap and an ice trap, the product gas was injected into a gas chromatograph (Hewlett-Packard HP6890) to carry out TCD and FID analyses. The extent of the reforming reaction (methylnaphthalene decomposition rate) was assessed based on the methane selectivity, CO selectivity, $CO_2$ selectivity and the deposition rate of carbon deposited on the catalyst. These were calculated using the following equations from the concentrations of each component in the outlet gas.

Methane selectivity (%)=(amount of volume of $CH_4$)/(amount of C supplied in supplied methylnaphthalene)×100

CO selectivity (%)=(amount of volume of CO)/(amount of C supplied in supplied methylnaphthalene)×100

$CO_2$ selectivity (%)=(amount of volume of $CO_2$)/(amount of C supplied in supplied methylnaphthalene)×100

Carbon deposition rate (%)=(weight of deposited carbon)/(amount of C supplied in supplied methylnaphthalene)×100

In addition, the ratio of outlet hydrogen gas volume to inlet hydrogen gas volume (hydrogen amplification rate) is also shown.

TABLE 1

| No. | 1 | 2 | 3 | 4 | 5 |
|---|---|---|---|---|---|
| Reaction temp. (° C.) | 600 | 700 | 800 | 900 | 1000 |
| $H_2S$ conc. (ppm) | 2000 | 2000 | 2000 | 2000 | 2000 |
| Methane selectivity (%) | 3.7 | 2.9 | 1.6 | 0.3 | 0.1 |
| CO selectivity (%) | 3.2 | 16.7 | 55.5 | 63.1 | 67.1 |
| $CO_2$ selectivity (%) | 7.2 | 12.1 | 23.1 | 29.2 | 28.2 |
| Carbon deposition rate (%) | 11.5 | 11.7 | 9.6 | 1.3 | 0.1 |
| $H_2$ amplification rate (—) | 1.3 | 1.5 | 2.1 | 2.3 | 2.4 |
| Decomposition rate (%) | 25.6 | 43.4 | 89.8 | 93.9 | 95.5 |

According to the results for Nos. 1 to 5 in Table 1, the decomposition reaction of the methylnaphthalene serving as simulated tar proceeded even in an atmosphere containing a high concentration of $H_2S$ of 2000 ppm, suggesting that the catalyst produced according to the present production method is highly resistant to sulfur poisoning. In addition, decomposition rates (methane selectivity+CO selectivity+$CO_2$ selectivity+carbon deposition rate) increased as the reaction temperature rose in particular, and the decomposition reaction of methylnaphthalene was determined to proceed even under harsh conditions of high levels of sulfur poisoning and carbon deposition. In addition, the effects of sulfur poisoning decreased as the $H_2S$ concentration decreased, and decomposition rate further improved. Moreover, since the hydrogen amplification rate also increased accompanying increases in decomposition rate of the simulated tar, hydrogen bound to carbon composing the methylnaphthalene is thought to have been converted to hydrogen molecules accompanying decomposition by the catalyst. In addition, carbon deposition rates demonstrated comparatively low values, and those values decreased as the temperature became higher. In addition, the overall reforming reaction proceeded efficiently at high temperatures of 800° C. or higher, and the decomposition rate was determined to increase as the temperature became higher.

Example 2

Catalyst activity was evaluated under the conditions shown in Table 2 using the same catalyst as Example 1 and the same method as Example 1 with the exception of baking at 950° C. and using 30 cc of catalyst. Those results are shown in Table 2.

TABLE 2

| No. | 6 | 7 | 8 | 9 | 10 | 11 |
|---|---|---|---|---|---|---|
| Reaction temp. (° C.) | 600 | 700 | 800 | 900 | 800 | 800 |
| H$_2$S conc. (ppm) | 2000 | 2000 | 2000 | 2000 | 20 | 200 |
| Methane selectivity (%) | 2.6 | 2.1 | 2.2 | 0.1 | 1.2 | 1.5 |
| CO selectivity (%) | 2.8 | 7.6 | 33.0 | 62.7 | 55.6 | 49.7 |
| CO$_2$ selectivity (%) | 9.6 | 11.3 | 29.8 | 28.3 | 32.9 | 29.4 |
| Carbon deposition rate (%) | 3.3 | 6.2 | 9.5 | 1.5 | 1.6 | 6.5 |
| H$_2$ amplification rate (—) | 1.1 | 1.3 | 1.8 | 2.0 | 2.3 | 2.2 |
| Decomposition rate (%) | 18.3 | 27.2 | 74.5 | 92.6 | 91.3 | 87.1 |

According to the results of Nos. 6 to 9 in Table 2, reforming activity of the simulated tar increased and decomposition rate improved as the temperature rose up to 900° C. under an atmosphere having a high H$_2$S concentration of 2000 ppm. In addition, in comparing the results of Nos. 8, 10 and 11 in which the reaction temperature was the same but the H$_2$S concentration differed, although the decomposition rate of the simulated tar tended to decrease as the concentration became higher, decomposition rates were determined to demonstrate high activity of 74% at 800° C. even at an H$_2$S concentration of 2000 ppm.

In addition, evaluation of Ni grain size from the Ni(200) peak of the catalyst after the reaction as determined by wide-angle X-ray diffraction was carried out in the manner described below. First, after placing a sample in a powdered sample holder, a CuKα beam was generated at an output of 40 kV and 150 mA using the Rigaku RINT1500, and measurement was carried out using graphite for the monochromator under conditions of a value of 1° for the divergence slit and scattering slit, a value of 0.15 mm for the receiving slit, a value of 0.8 mm for the monochromatic receiving slit, a value of 0.01 deg for the sampling width, and a value of 2 deg/min for the scanning speed. Within the measurement profiles, the peak width at a location at a height of half the peak top (half-value width) was measured for the Ni(200) peak in which 2θ appears in the vicinity about 52 degrees in particular, and Ni grain size was calculated from that value using Scherrer's equation as indicated below.

$$D_{hkl} = K\lambda/\beta \cos\theta$$

Here, since $D_{hkl}$ indicates the size of crystal grains, when evaluated based on the Ni(200) diffraction line, it represents the size of Ni crystal grains. Although K is a constant, since a half-value width is used for β as indicated below, the value of this constant becomes 0.9. λ is the X-ray wavelength used for measurement, and in the measurement carried out here, it has a value of 1.54056 Å. In addition, β represents the spread of diffraction lines according to the size of the crystal grains, and the aforementioned half-width value was used for this value. θ represents the Bragg angle of the Ni(200) diffraction line.

Figure 3:
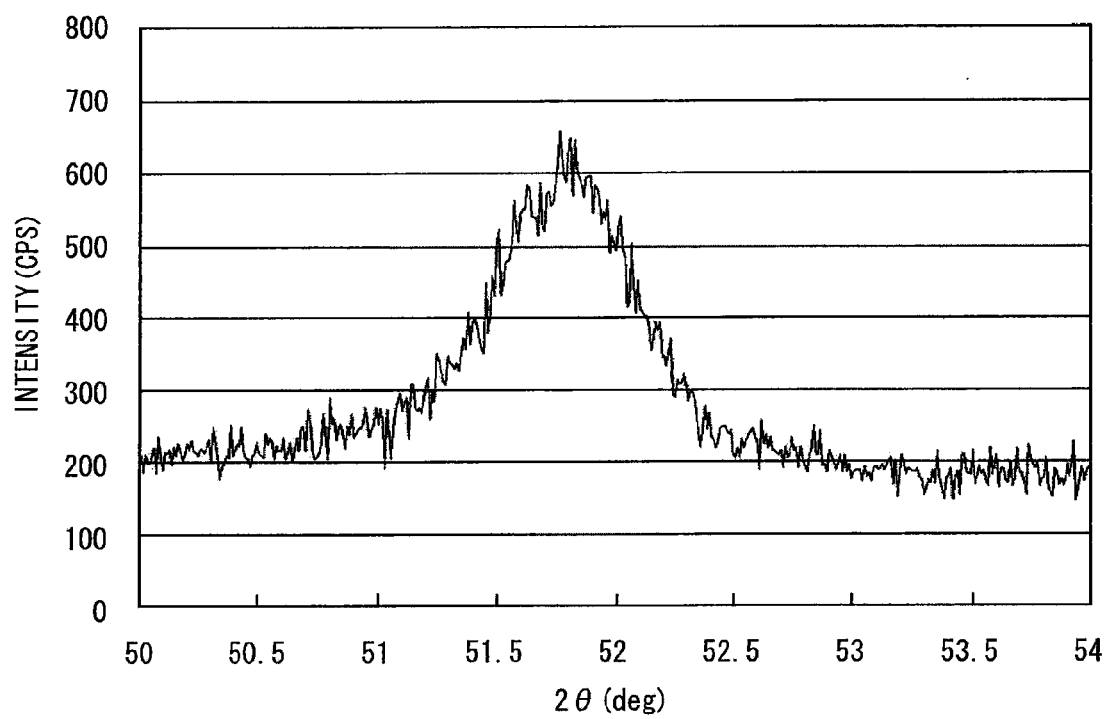
FIG. 3 is a wide-angle X-ray diffraction diagram of a portion equivalent to an Ni(200) peak of a catalyst after having been reacted in Example 2.

According to this method, Ni grain size, as determined from the Ni(200) peak by the wide-angle X-ray diffraction shown in FIG. 3 after crushing the catalysts used in this test, was calculated to be 13 nm, thereby demonstrating the precipitation of extremely fine Ni grains, which is thought to have been a factor in the appearance of high levels of reforming activity and resistance to carbon deposition.

Example 3

Catalysts were prepared in the same manner as Example 1 with the exception of adjusting the weight percentages of the nickel, magnesium and alumina in the nickel and magnesium oxides as shown in Tables 3 and 4. The conditions of No. 3 in Example 1 were used for the experiment conditions at a reaction temperature of 800° C., H$_2$S concentration of 2000 ppm and normal pressure. The results are shown in Tables 3 and 4.

TABLE 3

| No. | 12 | 13 | 14 | 15 | 16 | 17 | 18 |
|---|---|---|---|---|---|---|---|
| Ni (wt %) | 0.5 | 1 | 5 | 10 | 12 | 15 | 17 |
| Mg (wt %) | 12 | 11 | 10 | 5 | 3 | 25 | 17 |
| Alumina (wt %) | 80 | 80 | 80 | 80 | 80 | 50 | 50 |
| Methane selectivity (%) | 1.1 | 1.5 | 2.4 | 2.2 | 2.1 | 2.0 | 2.3 |
| CO selectivity (%) | 7.1 | 18.7 | 32.6 | 42.3 | 41.7 | 48.5 | 46.8 |
| CO$_2$ selectivity (%) | 11.5 | 18.3 | 32.2 | 26.1 | 28.6 | 25.7 | 26.5 |
| Carbon deposition rate (%) | 10.4 | 11.1 | 11.9 | 12.2 | 13.6 | 14.1 | 15.0 |
| H$_2$ amplification rate (—) | 1.2 | 1.4 | 1.8 | 1.9 | 1.9 | 2.1 | 2.2 |
| Decomposition rate (%) | 30.1 | 49.6 | 79.1 | 82.8 | 86.0 | 90.3 | 90.6 |

TABLE 4

| No. | 19 | 20 | 21 | 22 | 23 | 24 |
|---|---|---|---|---|---|---|
| Ni (wt %) | 25 | 1 | 5 | 35 | 50 | 55 |
| Mg (wt %) | 11 | 47 | 45 | 22 | 15 | 6 |
| Alumina (wt %) | 50 | 20 | 20 | 20 | 20 | 20 |
| Methane selectivity (%) | 2.8 | 1.5 | 2.3 | 4.0 | 4.5 | 5.1 |
| CO selectivity (%) | 45.5 | 17.6 | 32.2 | 45.6 | 45.1 | 46.6 |
| CO$_2$ selectivity (%) | 27.2 | 19.2 | 32.7 | 26.2 | 27.0 | 21.5 |
| Carbon deposition rate (%) | 16.5 | 9.3 | 9.9 | 17.0 | 17.6 | 21.8 |
| H$_2$ amplification rate (—) | 2.2 | 1.4 | 1.6 | 2.2 | 2.3 | 2.4 |
| Decomposition rate (%) | 92.0 | 47.6 | 77.1 | 92.8 | 94.2 | 95.0 |

According to the results of Tables 3 and 4, methylnaphthalene decomposition rate becomes lower and hydrogen amplification rate also decreases the smaller the amount of nickel serving as the main active component, and in the case of No. 12 in which the Ni content was less than 1% by weight, results were low for both decomposition rate and hydrogen amplification rate. On the other hand, decomposition rate and hydrogen amplification rate increased the greater the Ni content. However, in the case of No. 24 in which the Ni content exceeded 50% by weight, there was a large amount of carbon deposition. In addition, in comparisons between Nos. 13 and 20 and between Nos. 14 and 21, even though the Ni contents were roughly equal, due to the difference in the alumina content, a larger amount of the alumina component resulted in higher catalyst activity. This is predicted to be due to the alumina component finely cleaving the nickel-magnesia compound phase, resulting in a decrease in the size of Ni metal particles precipitating during reduction, and in turn causing an increase in reaction surface area. In addition, carbon deposition rates were lower for higher Mg contents, and in the case of No. 16 in which the Mg content was less than 5% by weight, there was a high level of carbon deposition.

Example 4

Catalysts were prepared and evaluated in the same manner as Example 1 with the exception of using a reaction temperature of 800° C., an H$_2$S concentration of 2000 ppm, and introducing H$_2$O, CO$_2$ and O$_2$ under each of the conditions shown in Table 5 at the time of reaction. The results are shown in Table 5. Furthermore, the C in the ratios H$_2$O/C, CO$_2$/C and O$_2$/C in the table indicate the supplied amounts of C of the supplied methylnaphthalene.

TABLE 5

| No. | 25 | 26 | 27 | 28 |
|---|---|---|---|---|
| $H_2O/C$ (—) | 3 | 3 | 3 | 3 |
| $CO_2/C$ (—) | 1 | 2 | 0 | 1 |
| $O_2/C$ (—) | 0 | 0 | 0.5 | 0.5 |
| Methane selectivity (%) | 2.0 | 2.0 | 1.8 | 1.6 |
| CO selectivity (%) | 50.1 | 51.5 | 45.6 | 46.2 |
| $CO_2$ selectivity (%) | 26.0 | 25.4 | 36.4 | 37.1 |
| Carbon deposition rate (%) | 11.9 | 12.3 | 8.7 | 8.6 |
| $H_2$ amplification rate (%) | 2.1 | 2.2 | 2.2 | 2.3 |
| Decomposition rate (%) | 90.0 | 91.2 | 92.5 | 93.5 |

According to the results of Table 5, when comparing with the results for No. 3 of Example 1, the reforming reaction was confirmed to be promoted by introducing $H_2O$, $CO_2$ or $O_2$ from the outside. Furthermore, in the case of introducing $O_2$, since absorbed heat of steam reforming using $H_2O$ or dry reforming using $CO_2$ can be compensated with the heat of combustion, this is an extremely effective technique in the case of assuming an actual reactor. In addition, introduction of $O_2$ also further reduced the carbon deposition rate.

Example 5

80 kg of charging coal used in actual coke ovens was filled into a batch oven capable of simulating a coke oven followed by heating to 800° C. in the same manner as an actual coke oven to generate actual coke oven gas and actual tar incidental thereto. The amount of tar in the tar-containing gas at that time was about 0.04 g/L. This gas was captured with a suction pump and used in the experiment. A reaction tube was arranged inside an electric furnace heated to a reaction temperature of 800° C., an oxide obtained by mixing 50% by weight of alumina into $Ni_{0.1}Mg_{0.9}O$ molded into the shape of a ring according to the same production method as Example 1 was placed in the center of the reaction tube, and after reducing for 2 hours at a hydrogen flow rate of 10 NL/min, gas captured from the batch oven was allowed to flow to a catalyst layer followed by continuously evaluating the catalyst decomposition activity on the actual coke oven gas and the actual incidental tar for 5 hours. The inlet gas flow rate was about 10 NL/min, and the amount of catalyst filled was about 1 L. Furthermore, the composition of the inlet gas was confirmed to be nearly the same as that of the actual coke oven gas by gas chromatography. In addition, the gas was confirmed to contain 2400 to 2500 ppm of hydrogen sulfide. The tar concentration in the gas was evaluated using the method described below. Namely, each gas was captured by preliminarily attaching a 1 L vacuum sampling bottle maintained at a vacuum to a control cock attached to the inlet and outlet of the catalyst layer and then opening the cock. The inside of the sampling bottle was then washed with dichloromethane, and after having completely removed the dichloromethane, the liquid component was weighed at normal temperature. The tar decomposition rate was determined from the ratio of the weight of the tar component in the catalyst layer outlet gas to the weight of the tar component in the catalyst layer inlet gas captured using the method described above. As a result, the tar decomposition rate when 2 hours had elapsed from the start of the reaction was 89%, and the hydrogen amplification rate reached an average of 2.3 over 5 hours.

Example 6

After carrying out a reaction continuously for 8 hours under the conditions of No. 3 of Example 1, loading of raw material was discontinued, and carbon and sulfur deposited on the catalyst were removed by using $N_2$ as a carrier gas at 60 cc/min and $H_2O$ at 60 cc/min as gas, setting the catalyst layer temperature to 800° C. and holding for 5 hours. Subsequently, when loading of raw material was resumed under the same conditions as Example 1, the catalyst was confirmed to demonstrate activity equal to 90% or more of that prior to regeneration. In addition, the hydrogen concentration in the gas following the reforming of this test was confirmed to be high, and the gas was confirmed to have been converted to a gas consisting mainly of hydrogen, carbon monoxide and methane.

Example 7

After carrying out a reaction continuously for 8 hours under the conditions of No. 3 of Example 1 in the same manner as Example 6, loading of raw material was discontinued, and carbon and sulfur deposited on the catalyst were removed by using $N_2$ as a carrier gas at 60 cc/min and air at 60 cc/min, setting the catalyst layer temperature to 800° C. and holding for 2 hours. Subsequently, when loading of raw material was resumed under the same conditions as Example 1, the catalyst was confirmed to demonstrate activity equal to 90% or more of that prior to regeneration. In addition, the hydrogen concentration in the gas after the reforming of this test was confirmed to be high, and the gas was confirmed to have been converted to a gas consisting mainly of hydrogen, carbon monoxide and methane.

Example 8

Figure 2:
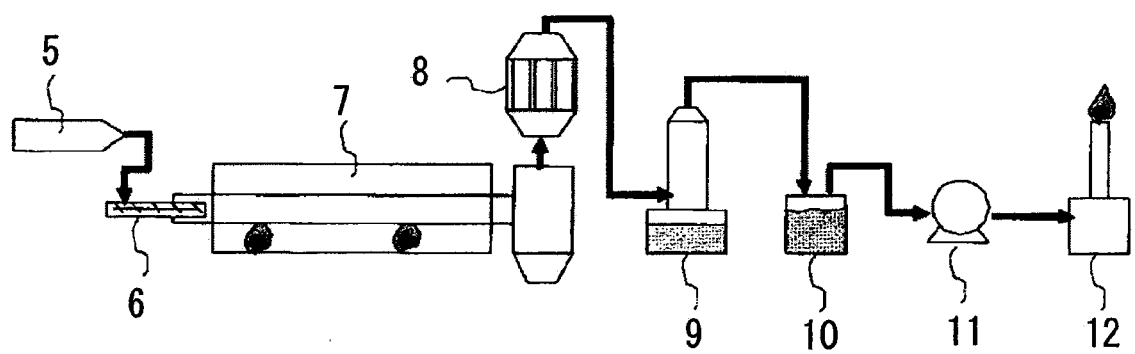
FIG. 2 is a drawing for explaining a coal dry distillation process in an example, and a process for reforming tar-containing gas generated therein using a catalyst.

After heating a rotary kiln 7 shown in FIG. 2 used as a dry distillation oven to 800° C., coal lumps were introduced into the rotary kiln 7 at a feed rate of 20 kg/h from a hopper 5 filled with coal lumps (sized to 5 cm or smaller) using a constant quantity feeder 6 to generate dry distillation gas containing tar. The tar-containing gas (dry distillation gas) was introduced into a catalyst tower 8 filled with a ring-shaped catalyst having the same composition as that of Example 1 and having an outer diameter of 15 mm, inner diameter of 5 mm and height of 15 mm followed by heating to about 800° C. while adjusting the gas flow rate to about 10 $Nm^3/h$ with an induced draft fan 11, and catalyst decomposition activity on the tar-containing gas was continuously evaluated for 8 hours by allowing the tar-containing gas to contact the catalyst. Subsequently, the reformed gas was water-cooled with a scrubber 9 and de-dusted with an oil babbler 10, followed by allowing combustion to dissipate with a flare stack 12. Furthermore, reduction treatment was carried out for 30 minutes with hydrogen at 5 $Nm^3/h$ prior to loading raw material. The inlet gas flow rate was about 10 $Nm^3/h$, and the amount of catalyst filled was about 15 L. The amount of tar in the tar-containing gas at that time was about 60 $g/Nm^3$. Furthermore, the composition of the inlet gas was confirmed to be nearly the same as that of actual coke oven gas by gas chromatography. In addition, about 6% of the water contained in the coal used as raw material volatilized and was contained as water vapor in the gas. Moreover, the gas was confirmed to contain 2000 to 2500 ppm of hydrogen sulfide. The tar concentration in the gas was evaluated by passing gas from the inlet and outlet of the catalyst layer through a five-stage impinger filled with dichloromethane by aspirating for a fixed period of time to capture the tar component in the gas, followed by quantifying the liquid component at normal temperature after having removed the dichloromethane. The tar decomposition rate was determined from the ratio of the weight of the tar component in the catalyst layer outlet gas to the weight of the tar component in the catalyst layer inlet gas captured using the method described above. As a result, the tar decomposition rate when 3 hours had elapsed from the start of the reaction was about 82%, the hydrogen amplification rate reached an average of 2.35 over 8 hours, and a catalytic dry gasification reaction of tar-containing gas was verified to proceed on a bench plant scale.

Example 9

Biomass tar-containing gas (dry distillation gas) was generated by using the same equipment as Example 8, feeding construction material waste chips (sized to 5 cm or smaller) to that equipment at a feed rate of 10 kg/h and dry distilling the chips with the rotary kiln 7 held at a temperature of 800° C. The tar-containing gas was introduced into a catalyst tower held at about 800° C. and filled with the same molded catalyst as Example 8 with the exception of having the same composition as No. 18 of Example 3, and catalyst decomposition activity on the tar-containing gas was continuously evaluated for 8 hours by allowing the tar-containing gas to contact the catalyst. Furthermore, reduction treatment was carried out for 30 minutes with hydrogen at 5 $Nm^3/h$ prior to loading raw material. The inlet gas flow rate was about 10 $Nm^3/h$, and the amount of catalyst filled was about 15 L. The amount of tar in the biomass tar-containing gas at that time was about 10 $g/Nm^3$. Furthermore, the composition of the inlet gas was confirmed to be similar to that of coke oven gas and be mainly composed of hydrogen, CO, methane and $CO_2$ by gas chromatography. In addition, about 16% of the water contained in the construction waste material used as raw material volatilized and was contained as water vapor. Moreover, the gas was confirmed to contain about 25 ppm of hydrogen sulfide. Furthermore, the tar decomposition rate was evaluated using the same method as Example 8 by capturing the tar component in tar-containing gas from the inlet and outlet of the catalyst layer and quantifying the resulting tar component. As a result, the tar decomposition rate when 3 hours had elapsed from the start of the reaction was 94.4%, the hydrogen amplification rate stabilized at about 6.5 over 8 hours, and a catalytic dry gasification reaction of biomass tar-containing gas was verified to proceed stably on a bench plant scale.

Example 10

Biomass tar-containing gas (dry distillation gas) was generated by using the same equipment as Example 8, feeding dry pieces (sized to 5 cm or smaller) of food waste gathered from supermarkets and the like to that equipment at a feed rate of 10 kg/h and dry distilling the food waste with the rotary kiln 7 held at a temperature of 800° C. The tar-containing gas was introduced into a catalyst tower held at about 800° C. and filled with the same molded catalyst as Example 8 with the exception of having the same composition as No. 18 of Example 3, and catalyst decomposition activity on the tar-containing gas was continuously evaluated for 8 hours by allowing the tar-containing gas to contact the catalyst. Furthermore, reduction treatment was carried out for 30 minutes with hydrogen at 5 $Nm^3/h$ prior to loading raw material. The inlet gas flow rate was about 10 $Nm^3/h$, and the amount of catalyst filled was about 15 L. The amount of tar in the biomass tar-containing gas at that time was about 23 $g/Nm^3$. Furthermore, the composition of the inlet gas was confirmed to be similar to that of coke oven gas and be mainly composed of hydrogen, CO, methane and $CO_2$ by gas chromatography. In addition, about 30% of the water contained in mixture of dry food waste and construction waste material used as raw material volatilized and was contained as water vapor. Moreover, the gas was confirmed to contain about 400 ppm of hydrogen sulfide. Furthermore, the tar decomposition rate was evaluated using the same method as Example 8 by capturing the tar component in tar-containing gas from the inlet and outlet of the catalyst layer and quantifying the resulting tar component. As a result, the tar decomposition rate when 3 hours had elapsed from the start of the reaction was about 88.5%, the hydrogen amplification rate remained stable at better than 4.5 at 4 hours after the start of the reaction even though it gradually decreased early in the reaction due to sulfur poisoning, and a catalytic dry gasification reaction of biomass tar-containing gas was verified to proceed stably on a bench plant scale.

Example 11

Biomass tar-containing gas (dry distillation gas) was generated by using the same equipment as Example 8, feeding a mixture of the same dry pieces (sized to 5 cm or smaller) of food waste of Example 10 and construction material waste chips (sized to 5 cm or smaller) mixed at a weight ratio of 1:2 to that equipment at a feed rate of 10 kg/h and dry distilling the mixture with the rotary kiln 7 held at a temperature of 800° C. The tar-containing gas was introduced into a catalyst tower held at about 800° C. and filled with the same molded catalyst as Example 8 with the exception of having the same composition as No. 18 of Example 3, and catalyst decomposition activity on the tar-containing gas was continuously evaluated for 8 hours by allowing the tar-containing gas to contact the catalyst. Furthermore, reduction treatment was carried out for 30 minutes with hydrogen at 5 $Nm^3/h$ prior to loading raw material. The inlet gas flow rate was about 10 $Nm^3/h$, and the amount of catalyst filled was about 15 L. The amount of tar in the biomass tar-containing gas at that time was about 14 $g/Nm^3$. Furthermore, the composition of the inlet gas was confirmed to be similar to that of coke oven gas and be mainly composed of hydrogen, CO, methane and $CO_2$ by gas chromatography. In addition, about 20% of the water contained in the mixture of dry food waste and construction waste material used as raw material volatilized and was contained as water vapor. Moreover, the gas was confirmed to contain about 200 ppm of hydrogen sulfide. Furthermore, the tar decomposition rate was evaluated using the same method as Example 5 by capturing the tar component in tar-containing gas from the inlet and outlet of the catalyst layer and quantifying the resulting tar component. As a result, the tar decomposition rate when 3 hours had elapsed from the start of the reaction was about 87.5%, the hydrogen amplification rate remained stable at about 4.6 at 4 hours after the start of the reaction even though it gradually decreased early in the reaction due to sulfur poisoning, and a catalytic dry gasification reaction of biomass tar-containing gas was verified to proceed stably on a bench plant scale.

Example 12

After reforming for 8 hours in Example 8, feeding of coal serving as raw material was discontinued and the system was purged with nitrogen. Subsequently, by taking in air from a gas intake port installed in the vicinity of the inlet of the rotary kiln 7 held at 800° C., and introducing air heated with the rotary kiln into a catalyst tower for about 10 hours, deposited carbon and adsorbed sulfur that had been deposited on the catalyst surface after reforming were removed by oxidation to regenerate the catalyst. Subsequently, after purging the system with nitrogen to expel oxygen component, reduction treatment was carried out again for 30 minutes with hydrogen at 5 Nm³/h. Subsequently, raw material was feed at the same rate as Example 8, and catalyst decomposition activity on the tar-containing gas was continuously evaluated for 8 hours by allowing the tar-containing gas to contact the catalyst. As a result, values were obtained for tar decomposition rate and hydrogen amplification rate after regeneration that were similar to those prior to regeneration, and the catalyst was verified to have been adequately regenerated by combustion of air. In addition, although catalytic decomposition of this tar-containing gas and subsequent catalyst regeneration were repeated five times, stable results were obtained for hydrogen amplification rate that were similar to those prior to regeneration, and long-term operation was found to be possible.

Example 13

After reforming for 8 hours in Example 9, feeding of construction material waste chips serving as raw material was discontinued and the system was purged with nitrogen in the same manner as Example 12. Subsequently, by taking in air from a gas intake port installed in the vicinity of the inlet of the rotary kiln 7 held at 800° C., and introducing air heated with the rotary kiln into a catalyst tower for about 10 hours, deposited carbon and adsorbed sulfur that had been deposited on the catalyst surface after reforming were removed by oxidation to regenerate the catalyst. Subsequently, after purging the system with nitrogen to expel oxygen component, reduction treatment was carried out again for 30 minutes with hydrogen at 5 Nm³/h. Subsequently, raw material was feed at the same rate as Example 9, and catalyst decomposition activity on the tar-containing gas was continuously evaluated for 8 hours by allowing the tar-containing gas to contact the catalyst. As a result, values were obtained for tar decomposition rate and hydrogen amplification rate after regeneration that were similar to those prior to regeneration, and the catalyst was verified to have been adequately regenerated by combustion of air in the case of construction material waste chips as well. In addition, although catalytic decomposition of this biomass tar-containing gas and subsequent catalyst regeneration were repeated six times, stable results were obtained for hydrogen amplification rate that were similar to those prior to regeneration, and long-term operation was found to be possible.

Example 14

After reforming for 8 hours in Example 10, feeding of dry pieces of food waste serving as raw material was discontinued and the system was purged with nitrogen in the same manner as Example 12. Subsequently, by taking in air from a gas intake port installed in the vicinity of the inlet of the rotary kiln 7 held at 800° C., and introducing air heated with the rotary kiln into a catalyst tower for about 10 hours, deposited carbon and adsorbed sulfur that had been deposited on the catalyst surface after reforming were removed by oxidation to regenerate the catalyst. Subsequently, after purging the system with nitrogen to expel oxygen component, reduction treatment was carried out again for 30 minutes with hydrogen at 5 Nm³/h. Subsequently, raw material was feed at the same rate as Example 10, and catalyst decomposition activity on the tar-containing gas was continuously evaluated for 8 hours by allowing the tar-containing gas to contact the catalyst. As a result, values were obtained for tar decomposition rate and hydrogen amplification rate after regeneration that were similar to those prior to regeneration, and the catalyst was verified to have been adequately regenerated by combustion of air in the case of dry pieces of food waste as well. In addition, although catalytic decomposition of this biomass tar-containing gas and subsequent catalyst regeneration were repeated five times, stable results were obtained for hydrogen amplification rate that were similar to those prior to regeneration, and long-term operation was found to be possible.

Example 15

After reforming for 8 hours in Example 11, feeding of a mixture of dry pieces of food waste and construction material waste chips serving as raw material was discontinued and the system was purged with nitrogen in the same manner as Example 12. Subsequently, by taking in air from a gas intake port installed in the vicinity of the inlet of the rotary kiln 7 held at 800° C., and introducing air heated with the rotary kiln into a catalyst tower for about 10 hours, deposited carbon and adsorbed sulfur that had been deposited on the catalyst surface after reforming were removed by oxidation to regenerate the catalyst. Subsequently, after purging the system with nitrogen to expel oxygen component, reduction treatment was carried out again for 30 minutes with hydrogen at 5 Nm³/h. Subsequently, raw material was feed at the same rate as Example 11, and catalyst decomposition activity on the tar-containing gas was continuously evaluated for 8 hours by allowing the tar-containing gas to contact the catalyst. As a result, values were obtained for tar decomposition rate and hydrogen amplification rate after regeneration that were similar to those prior to regeneration, and the catalyst was verified to have been adequately regenerated by combustion of air in the case of a mixture of dry pieces of food waste and construction material waste chips as well. In addition, although catalytic decomposition of this biomass tar-containing gas and subsequent catalyst regeneration were repeated five times, stable results were obtained for hydrogen amplification rate that were similar to those prior to regeneration, and long-term operation was found to be possible.

Comparative Example 1

When a reforming test was carried out by using a kind of industrial catalyst in the form of a naphtha primary reforming catalyst manufactured by Sud-Chemie Catalysts Japan (SC11NK: loaded with Ni at 20% by weight and having high strength of 500 N) using the same experimental method as Example 1 and under the conditions of No. 8 of Example 2, methane selectivity was 2.5%, CO selectivity was 4.2%, $CO_2$ selectivity was 5.9%, carbon deposition rate was 32.8%, decomposition rate was 45.4% and hydrogen amplification rate was 1.3.

Thus, results were obtained indicating that, while having a low conversion rate of methylnaphthalene to gas components (12.6%), the industrial catalyst has an extremely high carbon deposition rate. Since the carbon deposition rate is extremely high, there is considerable risk of short catalyst life. In addition, even if regeneration treatment were to be carried out after the reaction, since it is necessary to carry out oxidation treatment at a high temperature or for a long period of time, particles having catalytic activity undergo sintering due to the large heat of combustion at that time, and performance after regeneration is predicted to be even lower.

Comparative Example 2

An evaluation was carried out by placing the industrial catalyst (SC11NK) used in Comparative Example 1 in a reaction tube using the same test equipment as Example 5 and under the same conditions as Example 5. As a result, the tar decomposition rate only reached 22% after 2 hours had elapsed from the start of the reaction, the hydrogen amplification rate also averaged only about 1.5 over 5 hours, and the tar decomposition rate was also determined to be low even when the industrial catalyst was evaluated in the presence of actual coke oven gas and actual tar.

Comparative Example 3

After preparing a precipitate of nickel and magnesium in the same manner as Example 1 followed by filtering, washing and drying, the precipitate was baked for 20 hours in air at 950° C. to obtain a nickel and magnesia compound. Subsequently, a silica sol was added so that the ratio of $SiO_2$ in the catalyst was 50% by weight to prepare a slurry. Subsequently, spray-drying was carried out under conditions such that the average grain size was 50 μm, and the resulting powder was baked in air at 950° C. Moreover, after molding and baking the resulting solid solution oxide using the same procedure as Example 1, activity was evaluated under the same conditions as No. 8 of Example 2. As a result, catalyst activity was such that the decomposition rate of methylnaphthalene was extremely low at only about 15%, hydrogen amplification rate was 1.0 indicating that hydrogen was not amplified at all, and catalyst activity was determined to be low.

Comparative Example 4

A precipitate of nickel and magnesium was prepared in the same manner as Example 1 followed by filtering, washing and drying. Subsequently, the precipitate was baked in air at 950° C. to obtain a nickel and magnesia compound. Subsequently, an alumina powder was weighed out to 50% by weight and the two components were physically mixed using a mortar and pestle. After molding and baking the resulting mixture using the same procedure as Example 1, activity was evaluated under the same conditions as No. 8 of Example 2. As a result, although catalyst activity was such that the decomposition rate of methylnaphthalene was about 66.7% and the hydrogen amplification rate was 1.6, indicating moderate catalyst activity, strength was excessively low and determined to make practical use difficult.

Comparative Example 5

A precipitate was prepared using a precipitating agent from an aqueous solution containing nickel, magnesia and alumina followed by baking according to a production method as disclosed in, for example, Non-Patent Document 1 or Patent Document 8. Namely, a mixed solution was prepared by calculating and accurately weighing out nickel nitrate, magnesium nitrate and aluminum nitrate so that the molar ratio of the metal elements of nickel and magnesium was 1:9 in the same manner as Example 1 and the content as alumina was 50% by weight and then mixing in pure water at 60° C., after which an aqueous solution of potassium carbonate heated to 60° C. in the same manner as Example 1 was added followed by adequately stirring with a stirrer. Subsequently, after aging by continuing to stir for a fixed period of time while holding at 60° C., the precipitate was subjected to suction filtration followed by adequately washing with pure water at 80° C. Subsequently, the precipitate was transferred to an evaporating dish, dried at 120° C. and crushed with a mortar and pestle followed by press molding in the same manner as Example 1 using a compression molding machine to obtain a molded tablet. The molded tablet was baked at 1100° C. to prepare a molded catalyst product. Activity was evaluated using this molded product under the same conditions as No. 8 of Example 2. As a result, the catalyst only demonstrated moderate catalyst activity, demonstrating a methylnaphthalene decomposition rate of about 62.6% (carbon deposition rate: 19.9%) and a hydrogen amplification rate of 1.6, and the amount of deposited carbon was found to be extremely high.

Figure 4:
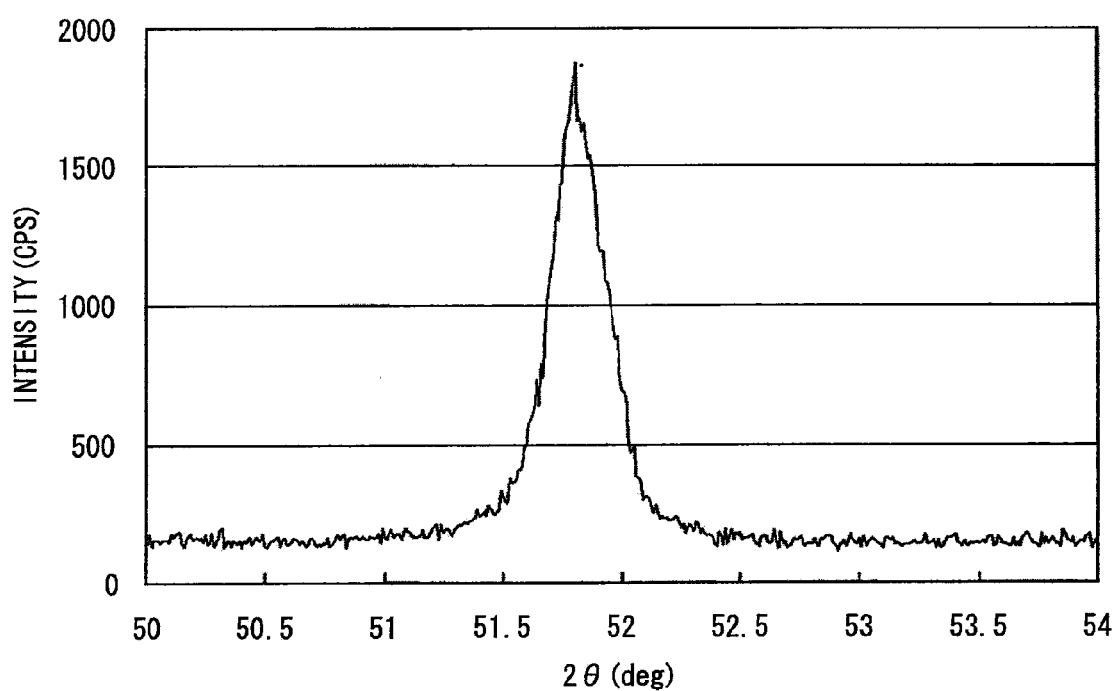
FIG. 4 is a wide-angle X-ray diffraction diagram of a portion equivalent to Ni(200) peak of a catalyst after having been reacted in Comparative Example 5.

In addition, the reacted catalyst was crushed using the same procedure as Example 2, Ni grain size as determined from the Ni(200) peak by wide-angle X-ray diffraction as shown in FIG. 4 was calculated to be 35 nm, and since Ni was unable to be finely precipitated from the compound prepared according to this method, this was thought to have resulted in a large amount of deposited carbon and low reforming activity.

| [BRIEF DESCRIPTION OF THE REFERENCE SYMBOLS] | |
|---|---|
| 1 | Riser tube |
| 2 | Aqueous ammonia |
| 3 | Coke oven |
| 4 | Dry main |
| 5 | Raw material hopper |
| 6 | Constant quantity feeder |
| 7 | Externally heated rotary kiln |
| 8 | Catalyst tower |
| 9 | Water scrubber |
| 10 | Oil babbler |
| 11 | Induced draft fan |
| 12 | Expanding flare stack |

The invention claimed is:

1. A method for producing a catalyst for reforming tar-containing gas, the method comprising:
    adding a precipitating agent to a mixed solution of a nickel compound and a magnesium compound, thus co-precipitating nickel and magnesium, and forming a precipitate;
    adding alumina powder and water or an alumina sol to the precipitate and mixing, thus forming a mixture,
    drying the mixture; and
    baking the mixture, thus producing a catalyst,
    wherein the precipitating agent causes the pH of the mixed solution to change to neutral or basic pH at which nickel and magnesium precipitate, and
    wherein a temperature of the baking is within the range of 700 to 1300° C.

2. The method for producing a catalyst for reforming tar-containing gas according to claim 1, the method further comprising at least one of calcining, crushing, and molding the mixture.

3. A method for producing a catalyst for reforming tar-containing gas, the method comprising:
    adding a precipitating agent to a mixed solution of a nickel compound and a magnesium compound, thus co-precipitating nickel and magnesium, and forming a precipitate;
    adding alumina powder and water or an alumina sol to the precipitate and mixing, thus forming a mixture,
    drying the mixture; and
    baking the mixture, thus producing a catalyst,
    wherein the precipitating agent causes the pH of the mixed solution to change to neutral or basic pH at which nickel and magnesium precipitate, and
    wherein the catalyst for reforming tar-containing gas has a nickel content of 1 to 50% by weight, a magnesium content of 5 to 45% by weight, and an alumina content of 20 to 80% by weight.

4. The method for producing a catalyst for reforming tar-containing gas according to claim 3, wherein the catalyst for reforming tar-containing gas has a nickel content of 1 to 35% by weight, a magnesium content of 10 to 25% by weight, and an alumina content of 20 to 80% by weight.

5. A method for producing a catalyst for reforming tar-containing gas, the method comprising:
- adding a precipitating agent to a mixed solution of a nickel compound and a magnesium compound, thus co-precipitating nickel and magnesium, and forming a precipitate;
- adding alumina powder and water or an alumina sol to the precipitate and mixing, thus forming a first mixture,
- drying and calcining the first mixture,
- adding the alumina powder and the water or the alumina sol to the dried and calcined first mixture and mixing, thus forming a second mixture,
- drying the second mixture; and
- baking the second mixture, thus producing a catalyst,
- wherein the precipitating agent causes the pH of the mixed solution to change to neutral or basic pH at which nickel and magnesium precipitate.

6. The method for producing a catalyst for reforming tar-containing gas according to claim 5, the method further comprising at least one of calcining, crushing, and molding the second mixture.

7. The method for producing a catalyst for reforming tar-containing gas according to claim 5, wherein the catalyst for reforming tar-containing gas has a nickel content of 1 to 50% by weight, a magnesium content of 5 to 45% by weight, and an alumina content of 20 to 80% by weight.

8. The method for producing a catalyst for reforming tar-containing gas according to claim 7, wherein the catalyst for reforming tar-containing gas has a nickel content of 1 to 35% by weight, a magnesium content of 10 to 25% by weight, and an alumina content of 20 to 80% by weight.

* * * * *